G. W. RUMBALL, Jr.
NUT LOCK.
APPLICATION FILED MAY 22, 1915.
1,196,032.
Patented Aug. 29, 1916.
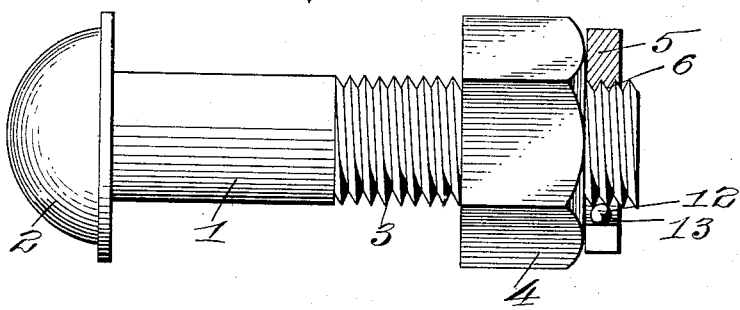
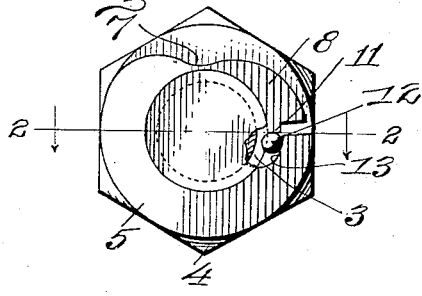   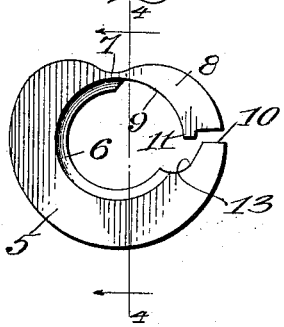
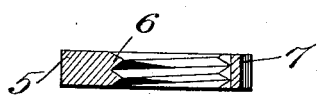
Witnesses
Inventor
George W. Rumball Jr.
By Richard B. Owen.
Attorney

UNITED STATES PATENT OFFICE.

GEORGE W. RUMBALL, JR., OF BEVERLY, MASSACHUSETTS, ASSIGNOR OF ONE-FOURTH TO THOMAS O. GILLIATT, OF ALLSTON, MASSACHUSETTS.

NUT-LOCK.

1,196,032. Specification of Letters Patent. Patented Aug. 29, 1916.

Application filed May 22, 1915. Serial No. 29,864.

*To all whom it may concern:*

Be it known that I, GEORGE W. RUMBALL, Jr., a citizen of the United States, residing at Beverly, in the county of Essex and State of Massachusetts, have invented certain new and useful Improvements in Nut-Locks, of which the following is a specification.

My invention relates to nut locks and more particularly to the washer type arranged as a top stop.

The primary object of my invention resides in the provision of a novel locking means, in this instance embodying a split washer for locking engagement with a bolt and for intimate contact with the top surface of a nut thereon for preventing outward movement of the nut on the bolt.

Another object of my invention resides in the provision of a novel clutch means consisting essentially of a steel ball for reception within the recess in the inner bore of the washer in order to be arranged in biting engagement with the bolt for preventing rotation of the washer, consequently preventing rotary movement of the nut on the bolt in an outward direction.

A still further object of my invention resides in the construction of a washer which is reduced on its outer periphery adjacent the slit to provide a flexing point, the portion between the flexing point and the slit possessing resiliency, thus permitting of the removal of this portion of the washer and allowing for the insertion of the ball, consequently locking the washer in any desired position on the bolt.

A still further object of my invention resides in the provision of a device of the character described that is simple in construction, efficient in operation and one that can be manufactured and placed on the market at a minimum cost.

Other objects as well as the nature, characteristic features and scope of my invention will be more readily understood from the following description taken in connection with the accompanying drawings and pointed out in the claims forming a part of this specification.

In the drawings: Figure 1 is a side elevational view of my invention showing the locking means in section and in locked position on the bolt; Fig. 2 is a top plan view of my invention, a portion thereof being broken away and illustrating to advantage the manner in which the ball is arranged in the washer; Fig. 3 is a top plan view of the washer; and Fig. 4 is a transverse sectional view taken on the line 4—4 of Fig. 3 in the direction in which the arrow points.

Referring more particularly to the drawings in which similar reference numerals designate like or corresponding parts throughout the different views, I provide a bolt 1 having a head 2 and the usual screw-threaded end 3, the outer end of the bolt having a nut 4 in screw-threaded engagement therewith, the nut being held in locked position thereon by means of my improved locking washer 5. It is, of course, to be understood that the nut and bolt form no part of my invention, being illustrated merely for the purpose of obtaining a thorough and comprehensive understanding of my invention.

The improved locking washer 5 is of the split ring type, the inner bore thereof being screw-threaded as at 6 for facilitating the engagement with the threaded end of the bolt 3. The outer periphery of the washer is reduced to provide preferably a substantially V-shaped recess 7, incidentally providing a flexing point which permits of the portion 8 of the washer between the flexing point and the slit to be moved outwardly from the side of the bolt for a purpose to be hereinafter described. In order to facilitate the removal of this resilient portion 8 from the side of the bolt, I have found it expedient to remove the threads 6 therefrom, consequently providing a recess 9 on the inner bore. The proximate ends of the washer are spaced as at 10, as illustrated to advantage in Fig. 3, the end of the portion 8 being provided with a lug 11 on the inner portion thereof which extends toward the opposite end, the lug facilitating the holding of a steel ball 12, receivable in the recess 13 provided on the inner bore adjacent the opposite end, in engagement with the threaded end of the bolt 3. It will thus be seen that the spaced proximate ends permit of the insertion of this ball 12 when the portion 8 is being held in a position away from the bolt, whereas the lug 11 will bear against the ball and force the lock into engagement with the threads and cam faced surface of the recess 12, thus securely maintaining the washer in a predetermined position on the bolt, preferably in intimate contact with the upper surface of the nut 4, consequently preventing outward movement of the nut 4 on the bolt.

In applying my improved washer to the bolt it is desirable that the nut 4 be arranged in the desired position on the bolt whereupon the washer is placed in abutting relation or intimate contact with the upper surface thereof and when in this position the resilient portion 8 is moved outwardly from the periphery of the bolt to permit of the insertion of the ball 12 within the recess 13, whereupon the resilient portion is released to allow it to swing back into position, consequently allowing the lug 11 to bear against the ball and force the same, due to the cammed face of the recess 13, into biting engagement with the threads on the bolt, thus causing the washer to be arranged in locked engagement with the bolt and at the same time prevent outward rotary movement of the nut on the bolt.

Although I have shown and described the preferred embodiment of my invention, I desire to be understood that I am not to be limited to the exact details shown, however, great stress is laid upon the arrangement of the resilient portion of the split washer which permits of the arrangement of the ball within the recess in the washer as well as illustrating the holding of the ball in position. It will be observed that the lug 11, ball 12 and recess 13 constitute a suitable clutch means for engagement with the bolt for preventing the movement of the washer and consequently the nut.

From the above description taken in connection with the accompanying drawings, it can easily be seen that I have provided a device that is simple in construction, containing but a few simple parts that can be cheaply manufactured and assembled and when assembled can be placed upon the market and sold at a minimum cost.

It will be understood that the above description and accompanying drawings comprehend only the general embodiment of my invention and that various minor changes in detail of construction, proportion and arrangement of the parts may be made within the scope of the appended claims and without sacrificing any of the advantages of my invention.

Having thus fully described my invention, what I claim as new and desire to secure by Letters Patent, is:

1. In combination with a bolt and a nut threaded thereon, a split resilient washer for removable engagement with the bolt above the nut, and a ball mounted in the washer and held in locked engagement with the bolt by the washer for preventing outward movement of the nut on the bolt.

2. In combination with a bolt and a nut threaded thereon, a split resilient washer for removable engagement with the bolt above the nut, a ball receivable within the washer adjacent one side of the slit, and a locking lug projecting from the washer on the other side of the slit for holding the ball in engagement with the bolt for preventing outward movement of the nut on the bolt.

3. In combination with a bolt and a nut threaded thereon, a split resilient washer for removable screw threaded engagement with the bolt above the nut for preventing outward movement of the nut on the bolt, and ball clutch means mounted within the washer for maintaining the washer in locked engagement with the bolt.

4. In combination with a bolt and a nut threaded thereon, a split washer engageable on the bolt arranged in intimate contact with the nut, a resilient portion provided on the washer, a ball receivable within the washer and held in engagement with the threads on the bolt through the medium of the resilient portion for locking the washer on the bolt and consequently preventing outward movement of the nut on the bolt.

5. In combination with a bolt and a nut threaded thereon, a split washer engageable on the bolt, the outer periphery of the washer being reduced to provide a resilient portion, the proximate ends of the washer being spaced, said washer being provided with a recess, a ball insertible within the recess when the resilient portion is moved, and a lock on the end of the resilient portion for holding the ball in biting engagement with the threads for consequently preventing outward movement of the nut on the bolt.

In testimony whereof I affix my signature in presence of two witnesses.

GEORGE W. RUMBALL, Jr.

Witnesses:
MARION A. WALDRON,
FRED A. RICH.